United States Patent
Krejtschi et al.

(10) Patent No.: US 8,294,392 B2
(45) Date of Patent: Oct. 23, 2012

(54) ARRANGEMENT FOR SUPPLYING POWER TO A COUPLED SYSTEM OF MACHINES

(75) Inventors: Jürgen Krejtschi, Nürnberg (DE); Elmar Schäfers, Fürth (DE)

(73) Assignee: Siemens Aktiengesellschaft, Münich (DE)

( * ) Notice: Subject to any disclaimer, the term of this patent is extended or adjusted under 35 U.S.C. 154(b) by 209 days.

(21) Appl. No.: 12/888,894

(22) Filed: Sep. 23, 2010

(65) Prior Publication Data
US 2011/0234125 A1    Sep. 29, 2011

(30) Foreign Application Priority Data
Sep. 24, 2009  (DE) .................. 10 2009 042 872

(51) Int. Cl.
*H02K 7/02* (2006.01)

(52) U.S. Cl. .............. 318/161; 180/65.235; 180/62.27; 180/65.285; 180/65.24; 903/906; 903/945; 903/951; 322/4; 280/738; 280/740; 318/106; 318/110; 318/34; 318/41; 318/66

(58) Field of Classification Search ............... 318/161, 318/106, 110, 34, 41, 66; 180/65.235, 65.24, 180/65.27, 65.28, 65.285; 903/903, 906, 903/945, 951; 475/5, 18; 280/738, 740; 322/4; 307/64, 68, 84

See application file for complete search history.

(56) References Cited

U.S. PATENT DOCUMENTS

| | | | | |
|---|---|---|---|---|
| 5,113,123 | A * | 5/1992 | Noser et al. | 318/106 |
| 6,239,513 | B1 * | 5/2001 | Dean et al. | 307/64 |
| 2009/0200968 | A1 * | 8/2009 | Behr et al. | 318/161 |

FOREIGN PATENT DOCUMENTS

| | | |
|---|---|---|
| DE | 166 779 C | 12/1905 |
| DE | 627 726 C | 3/1936 |
| DE | 639 230 C | 12/1936 |
| DE | 24 29 347 A1 | 1/1976 |
| EP | 1880837 A2 * | 1/2008 |

* cited by examiner

*Primary Examiner* — Walter Benson
*Assistant Examiner* — Jorge Carrasquillo
(74) *Attorney, Agent, or Firm* — Henry M. Feiereisen LLC

(57) ABSTRACT

An arrangement for supplying power to a system includes a first electric drive unit constructed to supply mechanical power to or receive mechanical power from a first coupled system of machines and a second electric drive unit constructed to supply mechanical power to or receive mechanical power from a second coupled system of machines. The first and second coupled system of machines are constructed to receive mechanical power or mechanical energy or to supply mechanical power or mechanical energy. The arrangement further includes a first kinetic energy storage device having a first electrical energy exchange machine which is electrically connected to the first electric drive unit, and a second kinetic energy storage device having a second electrical energy exchange machine which is electrically connected to the second electric drive unit. The first kinetic energy storage device is coupled to the second kinetic energy storage device.

11 Claims, 4 Drawing Sheets

ARRANGEMENT FOR SUPPLYING POWER TO A COUPLED SYSTEM OF MACHINES

CROSS-REFERENCES TO RELATED APPLICATIONS

This application claims the priority of German Patent Application, Serial No. 10 2009 042 872.0, filed Sep. 24, 2009, pursuant to 35 U.S.C. 119(a)-(d), the content of which is incorporated herein by reference in its entirety as if fully set forth herein.

BACKGROUND OF THE INVENTION

The present invention relates to an arrangement for supplying power to electrical drives, with energy being buffer-stored.

The following discussion of related art is provided to assist the reader in understanding the advantages of the invention, and is not to be construed as an admission that this related art is prior art to this invention.

At least two electric drive units are coupled to a coupled system of machines. The term "coupled system of machines" is understood to mean all possible machine applications or machines or parts thereof. This includes, for example, coupled system of machines in which:
 processes, for example machining processes, or
 methods, for example production methods, or
 movement runs, for example transport runs
take place.

A coupled system of machines is furthermore a machine tool, production machine or a machining center, for example.

It would therefore be desirable and advantageous to obviate prior art shortcomings and to provide an arrangement for supplying power to a coupled system of machines which is suitable for dynamic processes and with which it is possible to provide power or energy in an inexpensive and/or energy-efficient manner.

SUMMARY OF THE INVENTION

According to one aspect of the present invention, an arrangement for supplying power to a system includes a first electric drive unit constructed to supply mechanical power to or receive mechanical power from a first coupled system of machines, wherein the first coupled system of machines is constructed to receive mechanical power or mechanical energy or to supply mechanical power or mechanical energy, a second electric drive unit constructed to supply mechanical power to or receive mechanical power from a second coupled system of machines, wherein the second coupled system of machines is constructed to receive mechanical power or mechanical energy or to supply mechanical power or mechanical energy, a first kinetic energy storage device having a first electrical energy exchange machine which is electrically connected to the first electric drive unit, and a second kinetic energy storage device having a second electrical energy exchange machine which is electrically connected to the second electric drive unit. The first kinetic energy storage device is coupled to the second kinetic energy storage device.

An arrangement for supplying power has at least two electric drive units and at least two kinetic energy stores, which have an electrical energy exchange machine. The electrical energy exchange machines are connected electrically to the respective electric drive unit.

In the case of a large number of production and also machine tool applications, processes or process segments occur which require a supply, in certain phases, in particular in the short-term, of high powers, while in other process phases only lower powers or electrical currents or torques need to be supplied.

If an entire process has a plurality of individual processes (this is provided in pressing lines, for example), a phase shift of power profiles of the individual processes can be set in a targeted manner by controlling the temporal sequence of the individual processes, with the result that these power profiles are largely compensated for with respect to their power peaks.

In a method for operating production machines or machine tools, in particular in a method for guiding the movement of production machines or machine tools, the required power can be supplied, for example, by means of one or ore converters during all of the process phases. In this case, a voltage intermediate circuit or else a current intermediate circuit of one or more converters can be used as the energy store. Advantageously, a power transfer between different individual processes is provided, with in each case one electric drive unit being associated with at least two individual processes. The power transfer between the individual processes should take place in a robust, efficient and/or simple manner.

When feeding a plurality of individual processes with peak load components, at least partial compensation of the power peaks of the individual processes with respect to one another can be performed. This is achieved, for example, by virtue of the fact that the power sections of the individual electric drive units are connected to a common intermediate circuit. In the case of regulated intermediate circuits with low capacitance, however, it may arise that an imprecise compensation of the individual processes with respect to one another results in an immediate rise in the intermediate circuit voltage, which in turn results in recovery into the power supply system as a result of the feed. The energy therefore takes a path via a number of stations which, for their part, are subject to losses.

A further possibility of storing energy is a kinetic energy store. A shaft to be driven is connected mechanically and directly to a flywheel, for example, with the result that power peaks are smoothed and are thus kept away from the electrical coupled system of machines. However, with this approach it is difficult to permit a change in speed, which is particularly unsatisfactory in the case of a dynamic process.

In one configuration, an arrangement for supplying power to a coupled system of machines includes the following:
 a first electric drive unit configured to output mechanical power to a first coupled system of machines, wherein the first coupled system of machines to receive and/or output mechanical power or mechanical energy;
 a second electric drive unit configured to output mechanical power to a second coupled system of machines, wherein the second coupled system of machines to receive mechanical power or mechanical energy;
 a first kinetic energy store, which has a first electrical energy exchange machine, which is connected electrically to the first electric drive unit,
 a second kinetic energy store which has a second electrical energy exchange machine, which is connected electrically to the second electric drive unit.

The arrangement for supplying power to a coupled system of machines or to a plurality of coupled systems of machines relates here not only to the supply of power/energy to the coupled system of machines, but also to the recovery of power/energy from the coupled system of machines back to the arrangement. Thus, a capacity for recovery makes it possible to store energy, for example. The arrangement for supplying power to a coupled system of machines is therefore also understood to mean an arrangement for dissipating power.

In accordance with a configuration of the arrangement, if a system has a large number of individual processes, a required mechanical power can be fed to the individual process in each case via one or more synchronous motors. One or more individual processes can require very high powers in certain segments. Such power peaks can be isolated, for example, by using capacitor batteries or flywheels (kinetic energy store) in the drive systems of the individual processes or buffer-stored via a coupling of the intermediate circuits of the individual systems or else linked by means of direct coupling in terms of energy, as an alternative or in addition. In the case of coupling of the individual processes in terms of energy which is as direct as possible, losses can be reduced. Direct coupling in terms of energy can be achieved by means of an asynchronous machine which is in the form of a slip ring rotor as the electrical energy exchange machine which buffer-stores the AC components of the drive power of a process. A slip ring rotor or else a large number of slip ring rotors can be connected directly to the synchronous machine driving the process. A combination of drives has, for example, a slip ring rotor as energy exchange machine and a synchronous machine as electric drive unit. In this combination of drives, the synchronous machine is electrically interconnected directly with the asynchronous machine (slip ring rotor).

If a plurality of drive assemblies are to be connected in parallel, coupling in terms of energy between the individual processes can be achieved by mechanical coupling of the slip ring rotors. A power output or consumption by the synchronous machine has a direct effect on the associated slip ring rotor. In the form of a change in speed, a direct conversion from electrical energy to mechanical energy takes place there, and vice versa. The cause of this change in speed is naturally a corresponding torque of the machine. If, for example, two operating processes are now coupled with one another by virtue of the associated slip ring rotors being coupled mechanically and it is furthermore assumed that corresponding temporal control of the individual processes results in a first process outputting power when a second process needs power, a positive torque is generated at a first electrical energy exchange machine and a negative torque is generated at a second electrical energy exchange machine. In this case, the first electrical energy exchange machine is associated with the first process, and the second electrical energy exchange machine is associated with the second process. By virtue of the mechanical coupling between the electrical energy exchange machines, it is now possible for there to be a direct power flow from the first electric drive unit of the first process to the second electric drive unit of the second process and therefore from the first process to the second process, with no electrical converter with corresponding losses being involved in this energy exchange.

The change in speed of the first electrical energy exchange machine and the second electrical energy exchange machine which results when the processes are split is at least partially compensated for, as a result of which a feed synchronous machine (electrical feed machine) which is intended to keep the kinetic energy store on average at a defined energy level is also relieved of load. The kinetic energy store in this case has electrical energy exchange machines, in particular asynchronous machines, which are coupled to a mechanical shaft. In this case, too, losses are reduced, and, in addition, the required number of feed machines with the corresponding drive electronics is reduced.

In a further configuration, the arrangement for supplying power has a mechanical coupling between the first kinetic energy store and the second kinetic energy.

In a further configuration, the arrangement for supplying power has a feed machine, which supplies mechanical energy to the first kinetic energy store and/or to the second kinetic energy store. The supply of mechanical energy takes place continuously, for example.

The kinetic energy stores can output the stored kinetic energy in each case
  via the first electrical energy exchange machine and the first electric drive unit to the first coupled system of machines, or
  via the second electrical energy exchange machine and the second electric drive unit to the second coupled system of machines.

The first coupled system of machines is coupled in terms of energy to the second coupled system of machines such that the coupled system of machines can have different loads at the same time.

With the arrangement for supplying power, coupling in terms of energy which is subject to low wear between at least one kinetic energy store and an electric drive unit, which represents the driving machine of the system (coupled system of machines), which coupling also allows variable speed control of the electric drive unit in the event of simultaneous minimization of the required converter capacitance, can be realized.

The electric drive unit, which outputs its mechanical power to the system, is electrically connected directly to the first electrical machine. Since both the electric drive unit and the first electrical energy exchange machine each have a stator winding, advantageously the two stator windings of the electric drive unit and the first electrical machine are electrically connected directly.

In a configuration of the invention, the electric drive unit and the first electrical energy exchange machine represent a combination of a synchronous machine and an asynchronous machine. For example, the electric drive unit is in the form of a synchronous machine and the first electrical energy exchange machine is in the form of an asynchronous machine or the electric drive unit is in the form of an asynchronous machine and the first electrical energy exchange machine is in the form of a synchronous machine. In both cases, there is a combination of synchronous and asynchronous machines.

The required mechanical power is fed to the system or to the process running therein, such as a deformation process in a press, for example, via one or more electric drive units. The system, i.e. the process running therein, has process segments, for example, in which even very high powers may be required. High powers are powers which are above the power which is required on average by the system or the process.

In order to keep high powers away from an electrical power supply system, which is in particular a three-phase power supply system, and therefore not to subject the power supply system to peak loads, the arrangement according to the invention is equipped with a system-internal energy buffer store. The arrangement which has a combination of asynchronous machine and synchronous machine whose stator windings are connected electrically also makes it possible to reduce the required converter capacitance for managing high powers.

In one configuration of the arrangement, the electric drive unit has variable speed control. In this case, in particular a converter for variable speed control of the electric drive unit is provided. An electrical frequency of the electrical asynchronous machine, which is in the form of a slip ring rotor, can advantageously be set by means of the converter.

Since the electric drive unit and the first electrical energy exchange machine of the kinetic energy store are electrically connected to one another directly, speed control of the electric drive unit is possible by virtue of setting the electrical frequency of the asynchronous machine, which is in the form of a slip ring rotor.

Advantageously, the direction and intensity of a power flow between the electric drive unit and the first electrical machine, i.e. kinetic energy store, can be set variably by means of the converter via a shift in the electrical frequency of the slip ring rotor with respect to an electrical frequency of the synchronous machine.

The power transmission from the kinetic energy store to the electric drive unit takes place in particular by virtue of the fact that the first electrical energy exchange machine is operated in hypersynchronous fashion with respect to the electric drive unit and therefore acts as an electrical generator. As a result, the kinetically stored energy is supplied to the system.

In order to enable speed control of the electric drive unit, the respectively required torque needs to be provided in a flexible manner, which means that the slip frequency between the asynchronous machine and the synchronous machine needs to be capable of being set flexibly. In this way, this asynchronous machine is preferably in the form of a slip ring rotor, which makes it possible to set the electrical rotor frequency via a converter in a flexible manner. The required slip of the asynchronous machine which results from the instantaneous speed of the electric drive unit and the torque required at that time for the speed control can therefore be realized in a flexible manner. The stored kinetic energy can thus be supplied to the system or the process in regulated fashion via the electric drive unit.

In contrast to a mechanical solution, for example, by means of an automatic transmission, which is very complex and is subject to wear, a simple embodiment can be provided by means of a described arrangement, i.e. via the electrical and therefore wear-free connection of the electric drive unit and the kinetic energy store, in particular the first electrical energy exchange machine of the energy store A bidirectional power flow between the system and the kinetic energy store can be implemented by means of a described arrangement, said bidirectional power flow keeping in particular system-induced power peaks away from the power supply system.

In one embodiment, the kinetic energy store has at least one electrical feed machine, which is used for continuously feeding power to the kinetic energy store. The kinetic energy store can have, in addition to one, also a large number of electrical feed machines, with a large number of electrical feed machines being coupled mechanically to one another by means of a mechanical shaft. The electrical feed machine(s) is/are optionally operated, without speed control, directly on the power supply system or with speed control via a further converter.

The electrical feed machine can be in the form of an asynchronous machine, in particular a squirrel-cage rotor.

The embodiment of the electrical feed machine as an asynchronous machine has the advantage that said feed machine can be operated in unregulated fashion directly on the power supply system and only needs to cover the average power of the process in terms of its dimensions. In one configuration, the kinetic energy store is operated with a virtually invariable speed.

When using one of the described arrangements, a converter associated with a system can be designed such that this converter now no longer always needs to provide the total required powers to the electric drive unit which outputs mechanical power to the system. The required power is in practice split between the converter and the first electrical energy exchange machine of the kinetic energy store. The electrical feed machine can permanently provide mechanical power, with the electrical feed machine representing part of the kinetic energy store, which can also include the first electrical energy exchange machine, possibly a second and following electrical energy exchange machine and, for example, a flywheel.

In a further configuration of the arrangement, a speed of the kinetic energy store is fixed in optimum fashion corresponding to the power requirements of the system and a required speed setting range of the system with respect to dimensioning of the converter.

For flexible setting of the slip, the electrical frequency resulting from the mechanical rotation frequency of the asynchronous machine needs to be shifted via the converter in the speed range of the process characteristic of the process running in the system. For this purpose, the greater the frequency shift and the greater the power required by the process in this case, the more converter power that is required. Depending on the process, therefore, a minimum necessary converter power can be ensured by suitably fixing the speed of the electrical asynchronous machine (in this case the electrical energy exchange machine). This means that considerably lower powers need to be provided via the converter and therefore said converter can be designed to be considerably smaller, which results in cost savings.

For an efficient design of the arrangement, setting the speed of the kinetic energy store in the form of the first, second and possibly further electrical machines (electrical energy exchange machine) is important.

In particular, a turns ratio of the asynchronous machine, which is in the form of a slip ring rotor, corresponding to power requirements of the system and a required speed setting range of the system is fixed in optimum fashion with respect to dimensioning of the converter. The asynchronous machine has both a rotor winding and a stator winding, with the turns ratio describing the number of turns of the rotor and stator windings with respect to one another.

In a further configuration of the arrangement, the kinetic energy store has an additional flywheel. Depending on the desired kinetic energy, if appropriate, a flywheel can be coupled mechanically to the first, second, third etc. electrical machine and to a first or second or third . . . feed machine of the kinetic energy store.

By virtue of the arrangement according to the invention, the dimensions of the required converter can be considerably reduced and therefore the total costs of the arrangement can be lowered. Since the power requirement for large production machines and machine tools can easily be in the megawatts range, the amount of volume saved is considerable. One use example is presses, wherein a plurality of presses can be coupled via a kinetic energy store. A large number of presses has, for example, in each case at least one electric drive unit. The electric drive units of the presses are coupled electrically to a common energy store. This common energy store has one or more electrical energy exchange machines (a first, second, third, . . . electrical energy exchange machine). Furthermore, the common kinetic energy store can have a flywheel or a plurality of flywheels. The common kinetic energy store can also have one or more electrical feed machines. This arrangement is of course not restricted to the application area of presses.

The variable-speed power supply by virtue of wear-free direct coupling between the kinetic energy store and the electric drive unit represents a simple and therefore very robust system in comparison with mechanical solutions. By virtue of the special design of the arrangement, process-related power peaks can be kept away from the power supply system or can be at least reduced.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
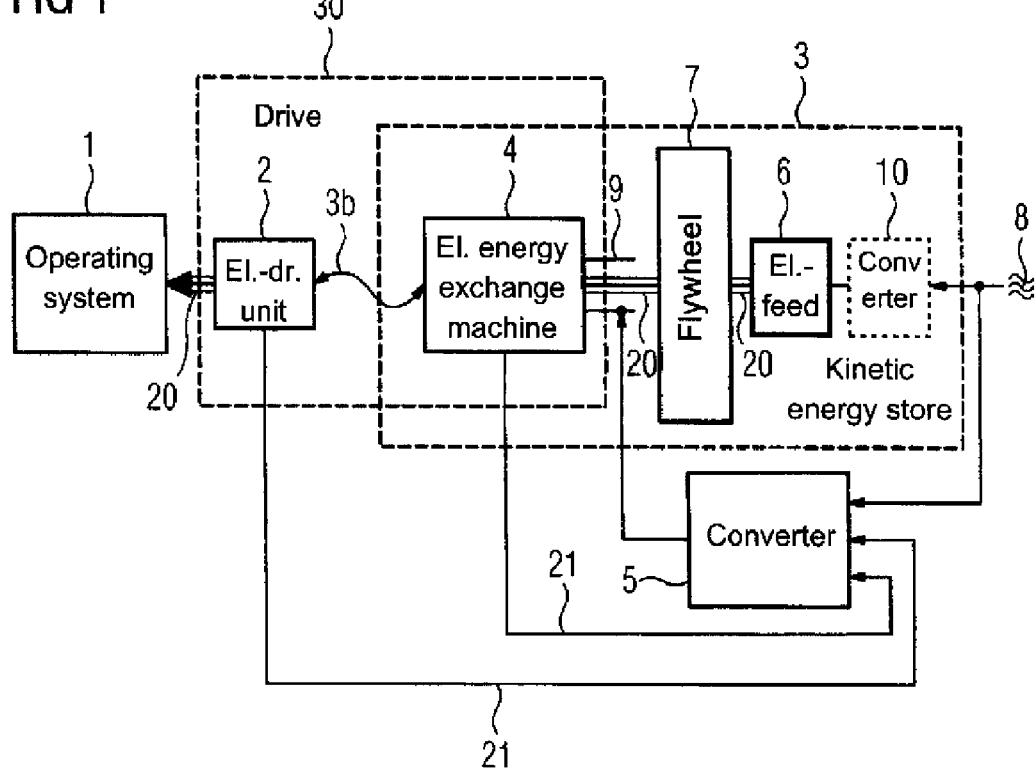
FIG. 1 shows a first arrangement for supplying power to a coupled system of machines in accordance with the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic design of a first arrangement. The arrangement has a system (a coupled system of machines) 1, which draws mechanical power. The system 1 is, for example, a production machine which implements a deformation process.

The mechanical power required is supplied to the system 1 via an electric drive unit 2. The electric drive unit 2 can be operated either as a motor or as a generator. In this exemplary embodiment, the electric drive unit 2 is an electrical synchronous machine, with it also being possible for a plurality of synchronous motors to be connected in parallel, which is not shown in FIG. 1, however.

In addition, the arrangement has a kinetic energy store 3, which in this exemplary embodiment comprises:
a first electrical energy exchange machine 4,
a flywheel 7, and
an electrical feed machine 6.

The first electrical energy exchange machine 4 is in the form of an asynchronous machine, in particular a slip ring rotor. Together with the electric drive unit 2, the electrical energy exchange machine 4 forms a combination of drives 30. The slip ring is denoted by the reference symbol 9. The electrical feed machine 6 is likewise in the form of an asynchronous machine in this example. The electrical feed machine 6 can also be a synchronous machine. Furthermore, it is also possible, for example, for an internal combustion engine to be used instead of the electrical feed machine. It is also possible to dispense with the flywheel 7 if sufficient kinetic energy can already be stored in the rotor of the first electrical machine.

The number of first electrical machines 4, feed machines 6 and flywheels 7 can be selected depending on the desired quantity of energy.

The feed machine 6 is used for continuously feeding power to the kinetic energy store 3. The electrical feed machine 6 can be operated either without speed control directly on a three-phase power supply system 8 or with speed control via a further converter 10. Therefore, the further converter 10 is illustrated by means of dashed lines.

In addition, the arrangement has a converter 5, which is provided for the speed control of the electric drive unit 2. In particular, the converter 5 is used for flexibly setting a rotor frequency of the first electrical energy exchange machine 4, which is in the form of an asynchronous machine. For this reason, this asynchronous machine is in the form of a slip ring rotor with a slip ring 9.

The system 1 or the process running therein requires, in certain process segments, very high powers. The first electrical energy exchange machine 4 is connected electrically to the electric drive unit 2, wherein the energy stored in the kinetic energy store 3, if necessary, is converted by the first electrical energy exchange machine 4 into electrical energy, is frequency-matched via a converter 5 and is then passed to the drive unit 2, which then supplies the system 1 with mechanical power/energy. The speed control of the electric drive unit 2 is implemented via the frequency matching by means of the converter 5.

The total power required by the system 1 is therefore split between the kinetic energy store 3 and the converter 5, as a result of which the converter 5 can be considerably smaller.

In each case, mechanical connections 20, such as one or more shafts, for example, are provided between the first electrical energy exchange machine 4, the flywheel 7 and the feed machine 6.

There is an electrical connection (single line shown in FIG. 1) between the electric drive unit 2 and the first electrical energy exchange machine 4, wherein in particular the stator windings of the first electrical machine and of the electric drive unit are connected electrically. There is also an electrical connection between the feed machine 6 and the three-phase power supply system 8 and possibly the further converter 10.

The converter 5 is connected electrically to the three-phase power supply system 8 and the first electrical energy exchange machine 4, in particular the slip ring 9. In addition, there is in each case one signal line 21 for regulating the speed (matching the electrical frequency) between the electric drive unit 2, the first machine 4 and the converter 5.

Figure 2:
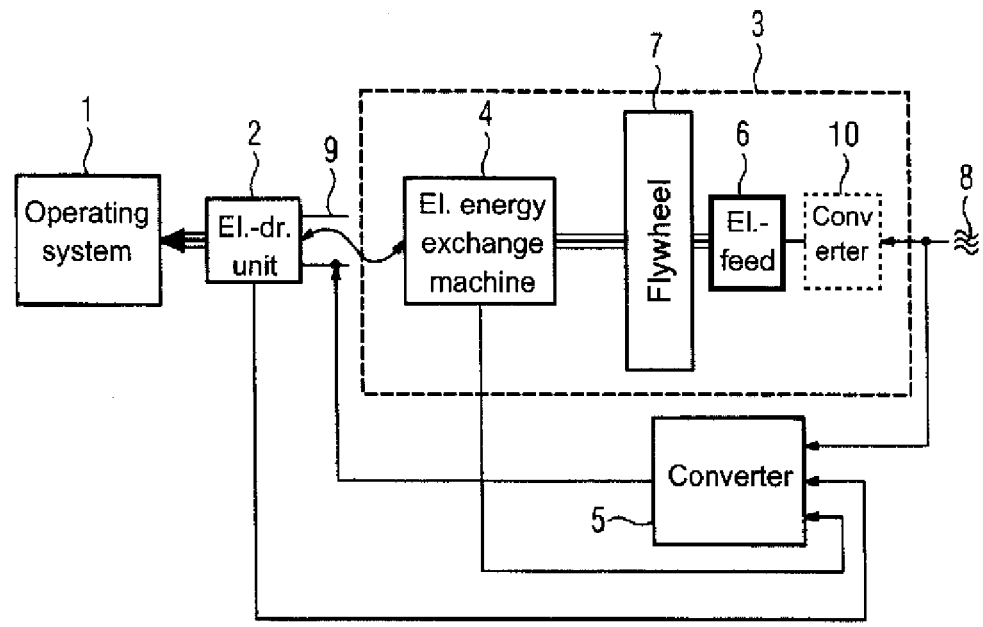
FIG. 2 shows a second arrangement for supplying power to a coupled system of machines in accordance with the invention.

FIG. 2 shows a schematic design of a further arrangement.

As has already been mentioned, the electric drive unit 2 and the first electrical energy exchange machine 4 of the kinetic energy store 3 represent a combination of a synchronous machine and an asynchronous machine.

As shown in FIG. 1, the drive unit 2 is in the form of a synchronous machine, for example, and the first electrical energy exchange machine 4 is in the form of an asynchronous machine (slip ring rotor).

As shown in FIG. 2, the drive unit 2 is now in the form of an asynchronous machine, in particular a slip ring rotor with a slip ring 9, and the first electrical energy exchange machine 4 of the kinetic energy store 3 is in the form of a synchronous machine.

The FIG. shows a combination of a synchronous machine and an asynchronous machine. The power transfer takes place from the kinetic energy store 3 to the electric drive unit 2 by virtue of the fact that the first electrical energy exchange machine 4 of the energy store 3 is operated in hypersynchronous fashion with respect to the electric drive unit 2 and therefore acts as electrical generator. As a result, the kinetically stored energy is supplied to the coupled system of machines 1.

Otherwise, the arrangement shown in FIG. 2 corresponds to the arrangement shown in FIG. 1.

Figure 3:
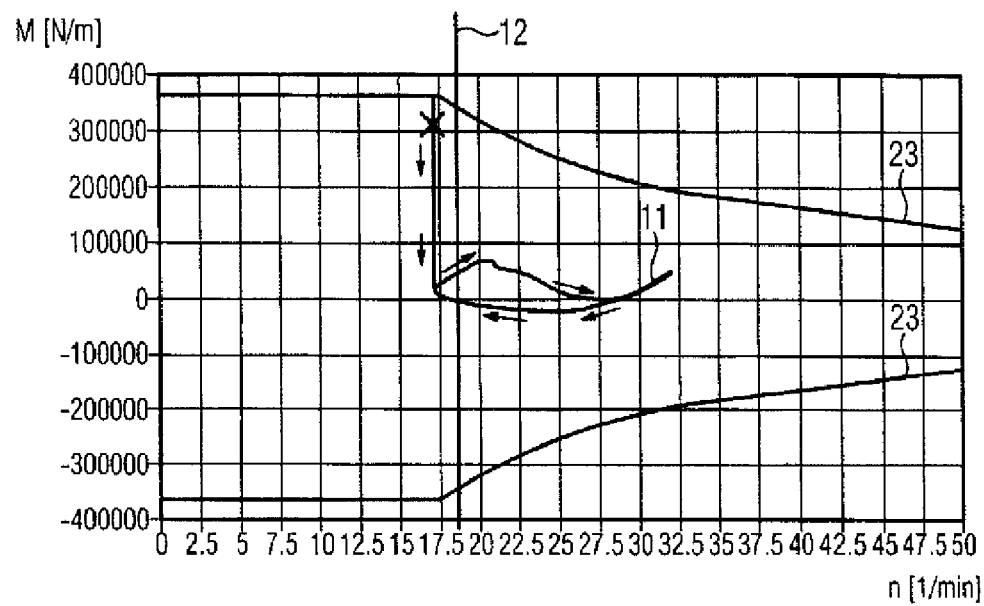
FIG. 3 shows a speed/torque characteristic in accordance with the invention.

FIG. 3 shows a graph of speed fixing of the first electrical energy exchange machine 4 of the kinetic energy store 3. The first electrical energy exchange machine 4 is in the form of an asynchronous machine and therefore the graph for the arrangement shown in FIG. 1 is provided.

Thee x-axis of the graph shows the speed of the electric drive unit 2 and the y-axis shows the torque of the electric drive unit 2.

The process characteristic 11 shows a torque characteristic of a typical deformation process. In this case, the temporal sequence of the deformation process is depicted by means of the arrows. The perpendicular arrows show the immediate deformation torque, wherein the braking phase then follows and then the deformation step again follows an acceleration phase, etc.

The motor torque characteristic of the electric drive unit 2 is illustrated by the reference symbol 23. The characteristic 12 shows the fixing of the speed for the first electrical energy exchange machine 4.

For an efficient design of the kinetic energy store 3, the fixing of the speed characteristic 12 of the first electrical machine 4 is of importance. For flexible speed setting (slip setting), the electrical rotor frequency resulting from the mechanical rotation frequency of the first electrical machine 4 needs to be shifted via the converter 5 in the speed range of the process characteristic 11. The greater the frequency shift and the greater the power required in this case by the system 1 and the process, the more converter power that is required. Depending on the process 11, a minimum necessary converter power can therefore be ensured by suitable speed fixing of the first electrical machine 4.

Figure 4:
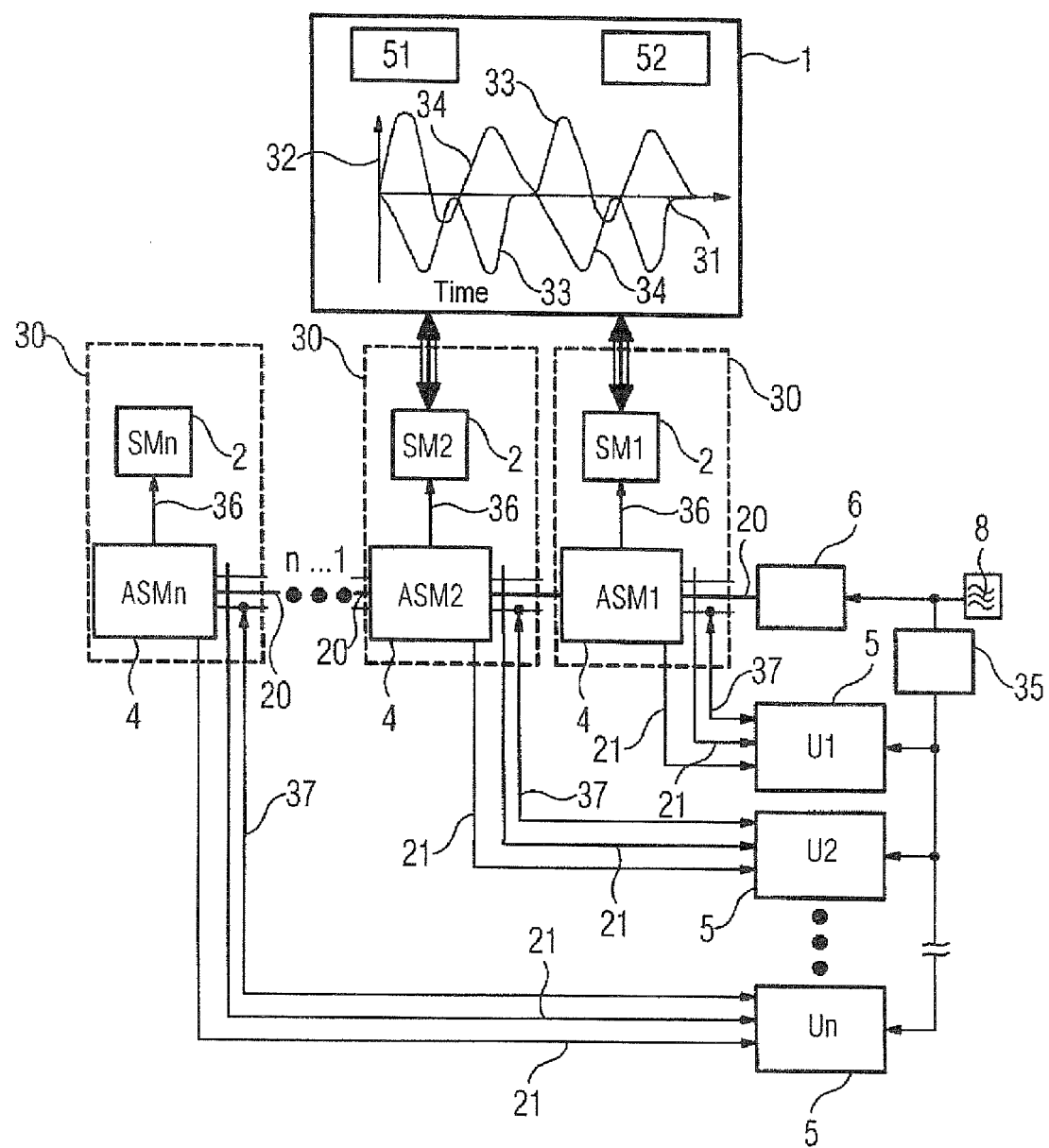
FIG. 4 shows a third arrangement for supplying power to a coupled system of machines in accordance with the invention.

The illustration shown in FIG. 4 shows an arrangement which has three combinations of drives 30. A first combination of drives 30 has:
  a first electric drive unit 2, which is a synchronous machine SM1,
  a first electrical energy exchange machine 4, which is an asynchronous machine ASM1, and
  an electrical connection 36 between the first drive unit 2 and the first electrical energy exchange machine 4.
  A second combination of drives 30 has:
  a second electric drive unit 2, which is a synchronous machine SM2,
  a second electrical energy exchange machine 4, which is an asynchronous machine ASM2, and
  an electrical connection 36 between the second electric drive unit 2 and the second electrical energy exchange machine 4.
  An arrangement can have combinations of drives 1 to n.
  An nth combination of drives 30 has:
  an nth electric drive unit 2, which is a synchronous machine SMn,
  an nth electrical energy exchange machine 4, which is an asynchronous machine ASMn, and
  an electrical connection 36 between the nth electric drive unit 2 and the nth electrical energy exchange machine 4.

The asynchronous machines ASM1, ASM2 and ASMn are coupled to one another together mechanically by means of a mechanical coupling 20. The mechanical coupling 20 is, for example, a shaft which connects the rotors of the asynchronous machines to one another mechanically.

A first converter U1 is associated with the first combination of drives, a second converter U2 is associated with the second, and a third converter U3 is associated with the third. These converters 5 are linked to the respective combination of drives 30 via signal lines 21. The converters 5 are connected to a power supply system 8. Another coupling device 35 can be located between the power supply system 8 and the converters 5 (Alm). This coupling device 35 is, for example, an inductor or a switch. The converters 5 are connected electrically to slip rings 9 of the asynchronous machines 4 via electrical lines 37.

The electrical feed machine 6 is also connected to the mechanical coupling. The electrical feed machine 6 draws power from the power supply system 8.

The arrangement illustrated makes it possible to couple even isolated individual processes directly to one another in terms of energy with the result that energy exchange is possible. The system 1 has, for example, a first process with a first power profile 33 and a second process with a second power profile 34. The power profiles are plotted in a graph shown in FIG. 4, with a power being plotted over the y-axis 32 and a time being plotted over the x-axis 31. The first electric drive unit is associated with the first process and the second electric drive unit is associated with the second process. The first power profile 33 is in this case produced in a first coupled system of machines 51 and the second power profile 34 is produced in a second coupled system of machines 52. The first coupled system of machines 51 and the second coupled system of machines 52 form a common system 1.

As already mentioned, FIG. 4 shows a plurality of combinations of drives 30 in parallel, in which in each case a slip ring rotor (ASM1 to n) is connected directly to a synchronous motor (SM1 to n). Coupling in terms of energy between the individual processes is possible in this drive variant as a result of simple mechanical coupling between the slip ring rotors (ASM1 to n).

Various advantages can result from an arrangement of this type or else from an arrangement of a corresponding type. Some of the possible advantages are listed below:
  by virtue of the arrangement shown, individual processes with high peak load components can be coupled to one another in terms of energy in a very direct and extremely simple manner;
  the direct coupling with only a few intermediate elements (no motor modules such as in the case of intermediate circuit coupling, for example) results in only few losses, as a result of which a high degree of energy efficiency can be achieved;
  since the nature of the coupling is largely based on the physical basic properties of the elements involved, only little complexity is to be expected for bringing such a system into operation;
  by virtue of the direct coupling between the individual processes, said individual processes act with respect to one another to a certain extent as energy stores, as a result of which the complexity involved in terms of devices can be reduced on the actual energy store;
  in the case of kinetic energy storage with slip ring rotors, there is the advantage by virtue of the coupling of the individual drive systems that no longer n feed machines are required but now only one.

Arrangements as described in accordance with FIGS. 1 and 2 can be connected in parallel corresponding to the teaching in accordance with FIG. 4. In this case, for example, it is possible for no flywheel, only one flywheel or else a plurality of flywheels to be used. A kinetic energy store in this case has at least one electrical energy exchange machine. The kinetic energy store can furthermore also have further rotary bodies which are suitable for storing kinetic energy.

Figure 5:
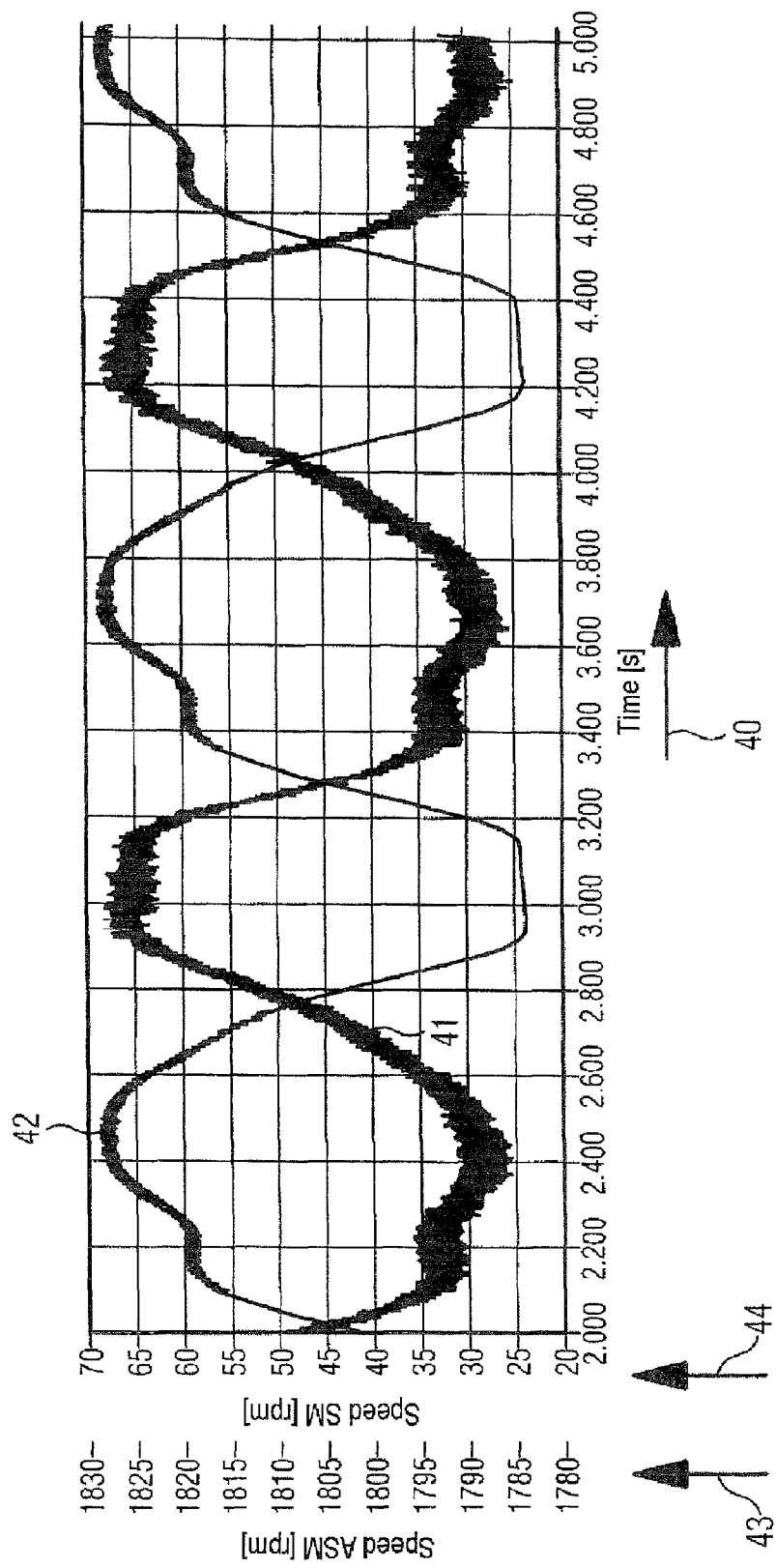
FIG. 5 shows speed signals with energy buffering in accordance with the invention.

The illustration shown in FIG. 5 shows signals in the case of energy buffer-storage which is performed using one of the described arrangements. A load cycle is simulated in such a way that a certain cyclic speed profile is run with the synchronous machine. This profile is identified by the reference symbol 42. The required power inflow or power outflow results in a mirror-image speed profile of the asynchronous machine which is electrically coupled directly (kinetic energy store). The profile of the asynchronous machine is identified by the reference symbol 41. The illustration shows the time 40 on the x-axis and the speed 43 of the asynchronous machine and the speed of the synchronous machine 44 on the y-axis. The AC load components in the speed and consequently also in the power can be buffer-stored to a considerable degree in the form of kinetic energy in the asynchronous machine which is electrically coupled directly.

Individual processes can be coupled in terms of energy in a simple manner. Excess or deficient electrical energy in the synchronous machine can be converted directly into or out of mechanical energy by the slip ring rotor. Mechanical energy flows from or into the slip ring rotor can either be buffer-stored in the form of speed changes (change in the kinetic energy) or passed on to a mechanically coupled slip ring rotor of a second individual system directly in the form of a torque with a corresponding speed.

Features and relationships described in individual variants can in principle be transferred to all exemplary embodiments. Furthermore, the invention is not restricted to the combinations of features disclosed in the exemplary embodiments. This relates to additional features as well as to omitted features.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An arrangement for supplying power to a system having at least two operating systems, the arrangement comprising
a plurality of electrical drive units constructed as synchronous machines, each electrical drive unit associated with a corresponding one of the at least two operating systems and constructed to supply mechanical power to or receive mechanical power from the corresponding operating system which is constructed to receive or to supply mechanical power or mechanical energy,
a plurality of kinetic energy storage devices coupled to one another, each kinetic energy storage device having a corresponding electrical energy exchange machine constructed as an asynchronous machine comprising a slip ring rotor and being electrically connected an electrical drive unit in one-to-one correspondence, and
a plurality of converters, each converter constructed to adjust an electrical frequency of the slip ring rotor of an electrical asynchronous machine connected to the converter with respect to an electrical frequency of a corresponding synchronous machine for variable speed control, said adjustment in the electrical frequency varying a direction and an intensity of a power flow between the electrical drive unit and the electrical machine,
wherein the system and the kinetic energy storage device are operatively connected for bidirectional power flow, said bidirectional power flow keeping system-induced power peaks away from a power grid or reducing a magnitude of the system-induced power peaks.

2. The arrangement of claim 1, wherein the plurality of kinetic energy storage devices are mechanically coupled to one another.

3. The arrangement of claim 2, wherein mechanically coupling is implemented with at least one of a shaft and a clutch.

4. The arrangement of claim 1, comprising a feeding machine constructed to supply mechanical energy to at least one of the kinetic energy storage devices.

5. The arrangement of claim 1, wherein the kinetic energy storage devices supply stored kinetic energy to the operating systems via the electrical energy exchange machines and the electrical drive units.

6. The arrangement of claim 1, wherein the operating systems are coupled with one another for energy transfer so as to enable the operating systems to have different loads at the same time.

7. The arrangement of claim 1, wherein each electrical drive unit and each electrical energy exchange machine have a stator winding, with the two stator windings of an electrical drive unit and an associated electrical energy exchange machine being directly electrically connected with each other.

8. The arrangement of claim 1, wherein the kinetic energy storage devices each comprise an electrical feed machine constructed to continuously feed power to the kinetic energy storage devices, wherein the corresponding electrical feed machines are operated either without speed control directly on the power grid or with speed control via an additional converter.

9. The arrangement of claim 8, wherein the electrical feed machine of the kinetic energy storage devices is implemented as an asynchronous machine.

10. The arrangement of claim 8, wherein the electrical feed machine is implemented as a squirrel-cage rotor.

11. The arrangement of claim 1, wherein the kinetic energy storage devices are coupled together and connected to a common electrical feed machine constructed to continuously feed power to the kinetic energy storage devices.

* * * * *